April 1, 1947.  W. H. COLBERT ET AL  2,418,335
REAR VIEW MIRROR
Filed Jan. 25, 1943   2 Sheets-Sheet 1

INVENTORS
William H. Colbert
Willard L. Morgan
BY
*Corbett, Mahoney & Miller*
ATTORNEYS April 1, 1947.　　　W. H. COLBERT ET AL　　　2,418,335
REAR VIEW MIRROR
Filed Jan. 25, 1943　　　2 Sheets-Sheet 2

INVENTORS
William H. Colbert.
Willard L. Morgan.
BY
ATTORNEYS

Patented Apr. 1, 1947

2,418,335

UNITED STATES PATENT OFFICE 2,418,335

REARVIEW MIRROR

William H. Colbert, Brackenridge, Pa., and Willard L. Morgan, Columbus, Ohio, assignors, by mesne assignments, to Libbey-Owens-Ford Glass Company, Toledo, Ohio, a corporation of Ohio Application January 25, 1943, Serial No. 473,472

2 Claims. (Cl. 88—77)

Our invention relates to a rear view mirror. It has to do, more particularly, with a rear view mirror for use in an automobile which presents for day driving a clear vision of an object behind the driver and for night driving provides for the location of other cars behind the driver without glare annoyance and dangerous distraction from their headlights.

One of the objects of our invention is to provide a mirror which is particularly useful as a rear vision mirror for automobiles under present-day driving conditions both during the day and at night.

Another object of our invention is to provide a rear view mirror for automobiles which will give clear images by day and by night and which will have limited reflectivity such that lights of the most intense illumination value, usually encountered on the highways at the present time, will not glare thereon.

Another object of our invention is to provide automobile rear view mirrors of the type indicated having the desired reflectivity and of various selected colors.

Another object of our invention is to provide a mirror of the type indicated of such a nature that multiple images and other sources of visual confusion or lack of clarity will be prevented so that the mirror can be of low reflectivity value and still give good visibility under both day and night driving conditions.

Various other objects will be apparent from the following description.

We have found that a rear view mirror for automobiles which has a reflectivity value of 18 to 22% provides good visibility in daytime driving and for night driving also reflects a clear bright image, which, even with the strongest light encountered at the present time on the highways, does not glare.

Many attempts were made by us to prepare mirrors of low reflectivity value in an effort to find mirrors which would have the desirable non-glare properties indicated above. However, since few materials are known which are good spectral reflectors and each of these, if in a mirror coating, has a fixed reflectivity percentage value, and not subject to experimental variation, direct attempts to determine the required characteristics were at first defeated. The narrowness of the satisfactory range of reflectivity also prevented its ready determination and the experimental trials by us to discover satisfactory non-glare properties generally gave mirrors which were either too dark under both day and night driving conditions or were too bright and glaring for night driving.

The desired range of 18 to 22% reflectivity value for an automotive mirror which will be non-glare under present night driving conditions is definitely narrow and specific. No known mirrors fit these specifications and in order to secure the desired advantages, after arriving at this range of desired reflectivity, we faced a seemingly impossible problem of making reflectors of these specific reflectivity characteristics.

In the accompanying drawings, we have illustrated certain examples of mirrors made according to our invention. In these drawings.

Figure 1:
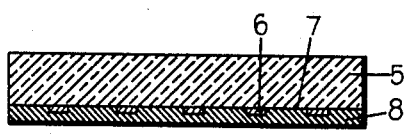
Figure 1 is a transverse sectional view taken through a glass support which carries a partially transparent mirror coating on its second surface.

According to our invention, it is possible to use commercially available plate glass for our mirrors. We have found that in order to avoid double images it is necessary that the two glass surfaces of the mirror be very closely parallel. Double images in mirrors are very confusing to the driver of an automobile when the two images are fairly closely alike in visibility. The additional second image of a second-surface mirror, not having parallel surfaces, comes from reflection from the front glass surface, which has a reflectivity value of 5%. The primary image is produced by reflection from the mirror coating on the back of the glass. If this coating has a high reflectivity value, as for example with silver, the brightness of the primary image is so far in excess of the brightness of any of the other images that the eye ignores all but the primary image. However, according to our invention in order to produce a mirror having a desired low reflectivity value of 18 to 22%, the mirror coating must have a low reflectivity value. The need of relatively parallel glass to be used as a support for rear view mirrors increases as the reflecting power of the second surface of the mirror decreases. Therefore, we have discovered that the two glass surfaces of the mirror of our invention must be closely parallel and the lack of parallelism must not exceed 32 seconds of arc if such confusing double images are to be avoided.

We discovered that some special colored glass might have reflectivity properties coming within our desired narrow range when coated with the usual commercial opaque metallic mirror films having fixed reflecting values, such as silver, gold or lead sulfide. However, the colored glasses available in sheets are far from parallel and are generally unsuitable as well as too expensive for this type of use. If we do use colored sheets of desired properties and coat them with a mirror coating to produce a mirror having a reflectivity value of 18 to 22% according to our invention, it is necessary that they first be ground flat to within close parallelism tolerance such that the lack of parallelism does not exceed 32 seconds of arc.

We prefer to use commercial colorless glass plate in making our mirrors. This type of glass plate, due to its production in continuous processes is available in sheets which can be selected to give a fair percentage yield within the close range of parallelism of 32 seconds of arc and is thus not a prohibitive costly support for our mirror film.

The commercial means of mirror formation do not permit us to produce mirrors in the desired reflecting range. Therefore, we have developed several special and new methods of mirror formation so as to produce mirrors of controlled reflectivity properties and within the range necessary according to our invention.

In general, we produce a mirror coating on the glass support which will be of such a nature that the mirror will have a reflectivity value of 18 to 22%. We preferably accomplish this by forming a mirror coating on ordinary colorless plate glass, the surfaces of which have the desired parallelism. The coating may be applied in various ways which we have determined will give the desired reflectivity. The coating is either a substantially continuous film that is relatively translucent or is in the form of an irregular predetermined pattern consisting of small areas or spots of opaque mirror surface and uncoated small areas or spots. The coating will either absorb a sufficient amount of the light striking the mirror or permit a sufficient amount of the light to pass on through the mirror, that only 18 to 22% of the light striking the mirror will be reflected. If colored glass plates are used, the mirror coating may be continuous and not translucent, provided the colored glass is of such a nature that it will absorb a sufficient amount of the light to give the mirror a reflectivity of 18 to 22%.

In the following description we have given several examples of ways in which our mirror may be produced. However, it is to be understood that various other methods may also be used. The first examples given below employ irregular patterns of reflective material in obtaining mirrors of desired reflectivity.

Figure 2:
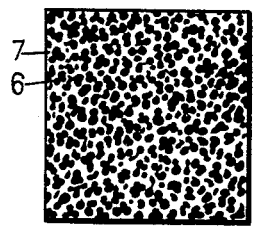
Figure 2 is a plan view of the mirror unit of Figure 1.
Figure 3:
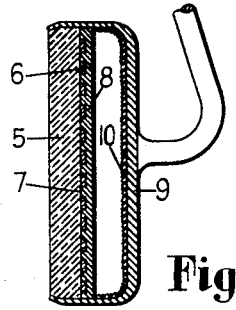
Figure 3 is a sectional view through a mirror embodying our invention and including the unit of Figures 1 and 2 mounted on a supporting frame.

As shown in Figures 1, 2 and 3, lead sulfide is present on a glass support 5 as a continuous pattern made of relatively thin lines 6 surrounding small dot areas 7 which are essentially clear to permit passage of light or which may be filled in with a transparent red lacquer 8 to absorb light.

In either case, if the clear transparent dot areas comprise 45% of the surface and the lead sulfide comprises 55% of the surface, the resulting reflection surface for the entire mirror is found to be 18%. In producing this mirror, commercially available colorless plate glass was first tested to indicate areas of the required mirror size that are parallel within 32 seconds of arc and these areas are cut out. An all-over mirror film of lead sulfide is produced on the surface of the glass by the usual method, such as those disclosed in Colbert et al. Patents 1,603,-936, of October 19, 1927; 1,647,957, of November 1, 1927; and 1,662,564, of March 13, 1928. The finished all-over mirror film is coated with a varnish film sensitive to light, and the correct pattern is produced on this light sensitive varnish film by contact or projection light exposure through a negative containing the pattern. The areas not exposed to the light are developed out leaving exposed areas of the bare mirror film which are then removed by etching. Then, the light-sensitive varnish film remaining over the patterned mirror area is removed by a solvent and the mirror coating, consisting of areas 6, and the support 5 are dried. The patterned mirror film is then coated with a vehicle containing red dye, which may be applied in the form of the continuous coating 8. I prefer to use a high viscosity nitrocellulose lacquer containing leveling agents because it is important that this red film be uniform and flat, and for low cost manufacture it should be sprayed rather than otherwise applied. Other coatings may be used just so they have the properties of drying out to a film that is uniform and flat and not deleterious to the mirror film.

The mirror above referred to may be mounted in a supporting frame 9 for use as a rear view automobile mirror, as shown in Figure 3. The surface of the frame in back of the mirror itself may be coated with any black material, indicated by numeral 10, such as a black flock adhered to the metal by a glue. In night driving when intense light strikes the mirror, the amount of light not absorbed or reflected by the support 5, the lead sulfide mirror areas 6 and the red film filter areas 8, is transmitted through the red film filters and is absorbed by the black flock absorbing medium 10 in the frame back of the mirror. Black velvet or other well known absorption media can be used instead of black flock, but black flock is preferably used because it is inexpensive and simple to apply.

Instead of using the mirror frame of Figure 3, the pattern coating of lead sulfide may be protected by a protective coating applied over the entire surface to be protected. This coating may be a black opaque coating of low reflective material, such as black lacquer. The spaces or holes between the continuous irregular fine pattern of lead sulfide will be filled in by this protective coating. These lacquer coatings on glass are generally of about 5% in reflectivity value, when used alone, and as 45% of the surface of the mirror is of this type while 55% of the surface is coated with lead sulfide, the general reflective value of the mirror as a whole is 20% and is within the range we desire.

Figure 4:
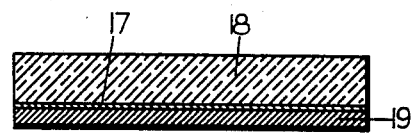
Figure 4 is a view similar to Figure 1, but showing a different type of mirror coating.

If an opaque film of lead sulfide is produced, as shown in the patents previously referred to, a mirror of fixed and relatively high reflectivity is obtained. However, if we deposit the lead sulfide under slow deposition conditions, which we have discovered, we have found that lead sulfide mirrors of much thinner coatings can be secured. Thus, thin coatings 17 (Figure 4) of lead sulfide on glass supports 18 of the required parallelism may be used in producing a mirror according to our invention. Either a first or second surface mirror can be produced. These thin partially transparent but reflective coatings 17 may be of various reflective values and colors. The amount of the various wave lengths of colored light actually reflected in a given mirror depends upon the thickness of these coatings. At certain thicknesses less of a given kind of light is reflected due to interference effects. The production of mirror films of desired reflectivity and wherein color is developed by interference effects is fully discussed in our co-pending application directed to colored mirrors and executed by William H. Colbert and Willard L. Morgan on the 21st day of January, 1943, and on the 21st day of January, 1943, respectively, namely, Serial No. 473.473. This new type of mirror coating thus offers us an entirely new means of securing mirrors of controlled and desired reflective values.

Figure 5:
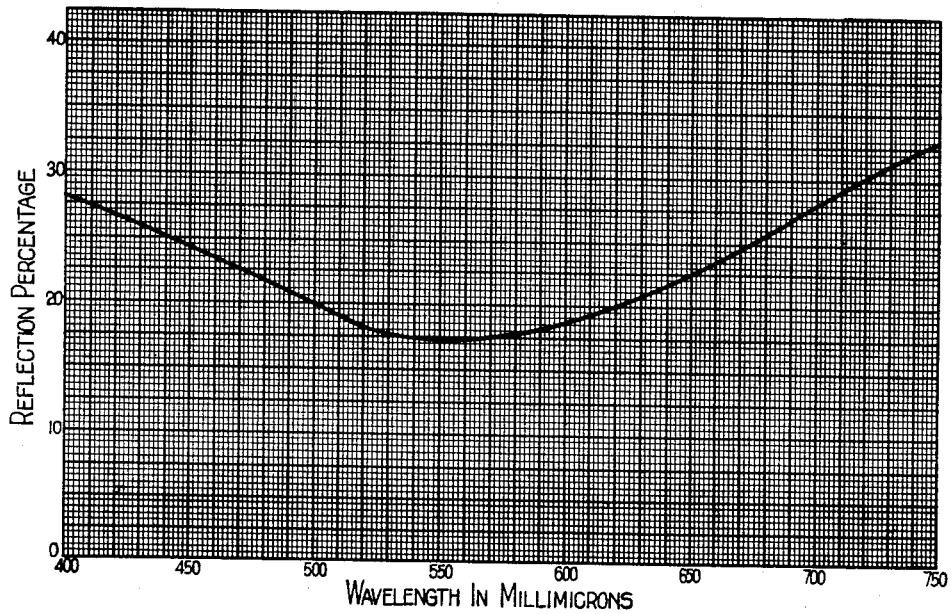
Figure 5 is a spectral reflection curve of a mirror, made according to our invention, wherein color is obtained by light interference.

To secure a mauve or clear reddish purple automotive rear view second surface mirror which has the desired spectral reflection curve shown in Figure 5, we proceed as follows.

From ordinary plate glass areas, which show parallelism to within less than 32 degrees of arc, are cut to be of the desired rear view automobile mirror size. These are cleaned and rinsed and then coated at 68 degrees Fahrenheit with a solution made by taking equal parts of the following three aqueous solutions: Solution A, which contains 3.18% of sodium hydroxide and .00054% sodium potassium tartrate; solution B, which contains 3.70% lead acetate and 0.264% acetic acid; and solution C, which contains 2.64% thiourea. These three solutions are mixed, just before pouring onto the glass, using about 2.8 cc. per square inch of glass, and all the solutions and glass and apparatus should be held in a room having a temperature controlled to 68 degrees. The mixed solution at the time of pouring is of the following composition:

| | Per cent |
|---|---|
| Sodium hydroxide | 1.06 |
| Lead acetate | 1.23 |
| Thiourea | 0.88 |
| Acetic acid | 0.088 |
| Sodium potassium tartrate | 0.00018 |

In order to secure a uniform result, we prefer to place the glass to be mirrored in a stainless steel pan and to rock the same about 35 times a minute, using a cut-out insert in the bottom of the pan to keep the glass from shifting. After 18 minutes from the time of pouring, the mirroring is stopped by adding a large amount of water to the pan and thereafter flushing off the surface of the mirror with further water, while gently rubbing with wet cotton. The deposited lead sulfide film 17 will be found to be approximately 0.036 micron thick and to show a transmission of light of about 15 to 30%. After being dried, preferably by warm air, it is immediately coated on the back with either a black lacquer or with a pigmented paint or other low reflective material to form an opaque layer 19.

Figure 6:
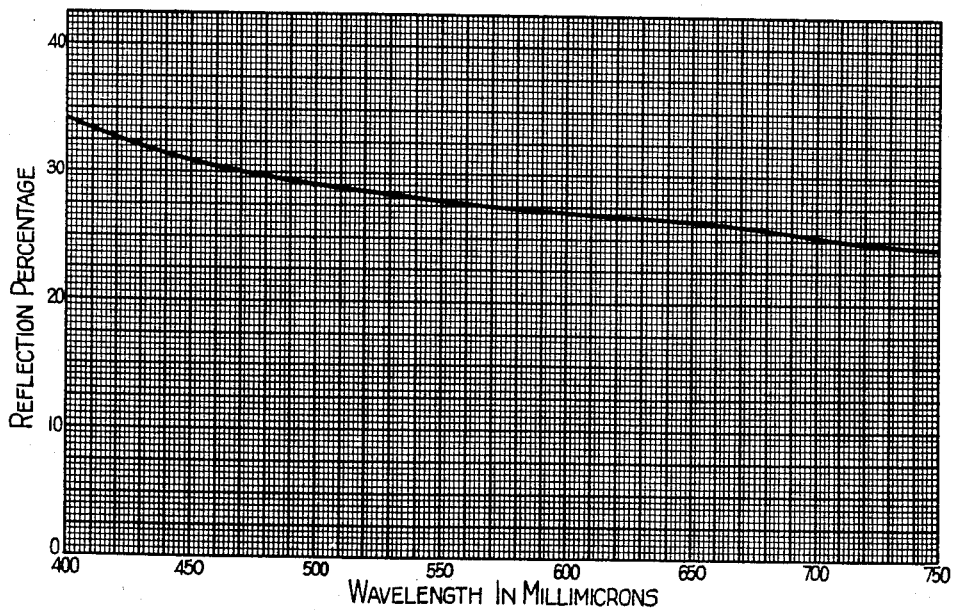
Figure 6 is a similar view showing a spectral curve of a prior art mirror which has substantially no color.

The mirror thus produced will show a total reflection of visible light of 21.6%. As shown in Figure 5, however, the reflection of 5500 wave length light in the yellow green spectrum is a minimum, since this thickness of lead sulfide film is just sufficient to cause a complete phase change in the light and to thus cause loss in light reflected by the light interference effect thus produced. Not all the light of 5500 Angstrom units is eliminated, as considerable of the reflected light is reflected at the top surface of the lead sulfide. However, the light which penetrates the partially transparent thin lead sulfide layer 17 and is reflected from its bottom surface is out of phase when it again leaves the lead sulfide layer and thus destroys an equal amount of light intensity upon emerging. The source of the red purple color is obvious and it is also apparent that the ordinary relatively thick films of lead sulfide, previously used as mirrors, could not do this. It is known and obvious from the curve of Figure 6 that they show no color other than a slight bluish cast.

Our mirror produced in this manner besides being of a pleasing color is found to give very sharp definition of objects and to be free of multiple images. With the lack of glare found in its use even when reflecting 32 to 100 candle power lamps these features make it particularly attractive for use as an automotive rear view mirror.

It will be apparent from the above description that we have provided a mirror which is particularly useful as a rear vision mirror for automobiles under present-day driving conditions both during the day and at night. It will give clear images by day and by night. Due to its limited reflectivity value of 18 to 22%, lights of the utmost intensity usually encountered on the highways at the present time will not glare thereon. The mirror may be of various selected colors. Furthermore, it will not have multiple images and other sources of visual confusion and will not be lacking in clarity. Consequently, it can be of low reflectivity value and still give good visibility under both day and night driving conditions.

Various other advantages will be apparent from the above description and the following claims.

Having thus described our invention, what we claim is:

1. A non-glare mirror of the second surface type, comprising a glass support having its second surface provided with a partially transparent reflective film of lead sulfide which gives the mirror as a whole a reflectivity of 18 to 22%, and a supporting frame for said mirror having its inner surface opposite said reflective film provided with a layer of light-absorbing material.

2. A non-glare mirror according to claim 1, wherein the layer of light-absorbing material is black flock adhered to the inner surface of said mirror supporting frame.

WILLIAM H. COLBERT.
WILLARD L. MORGAN.

REFERENCES CITED

The following references are of record in the file of this patent:

UNITED STATES PATENTS

| Number | Name | Date |
|---|---|---|
| 1,736,667 | Peacock | Nov. 19, 1929 |
| 1,603,936 | Colbert et al. | Oct. 19, 1926 |
| 1,647,857 | Colbert et al. | Nov. 1, 1927 |
| 1,199,882 | Frey | Oct. 3, 1916 |
| 1,990,222 | Burlein | Feb. 5, 1935 |
| 1,238,775 | Ives | Sept. 4, 1917 |

(Other references on following page)

| Number | Name | Date |
|---|---|---|
| 2,239,452 | Williams | Apr. 22, 1941 |
| 2,281,474 | Cartwright | Apr. 28, 1942 |
| 1,951,214 | Schlumbohm | Mar. 13, 1934 |
| 2,311,400 | Landell | Feb. 16, 1943 |
| 2,338,233 | Dimmick | Jan. 4, 1944 |
| Re. 22,076 | Cartwright et al. | Apr. 21, 1942 |
| 1,662,565 | Colbert et al. | Mar. 13, 1928 |
| 1,776,496 | Eiland | Sept. 23, 1930 |
| 1,425,967 | Hoffman | Aug. 15, 1922 |
| 1,231,710 | Comstock | July 3, 1917 |
| 1,698,307 | LaHodny | Jan. 8, 1929 |
| 2,041,667 | Thomas | May 19, 1936 |

OTHER REFERENCES

Cartwright et al. (Pub.), "Multilayer Films of High Reflecting Power," Physical Review, June 1939, 88–1 Refl. & Refr.

Edwards (Pub.), "Interference in Thin Metallic Films," Physical Review, vol. 38, July 1, 1931, pages 166–173. (Copy in Div. 7). 88–1 Refl. & Refr.

Pfund, "Highly Reflecting Films of Zinc Sulphide," Journal of the Optical Society of America, April 1934, vol. 24, No. 4, pages 99–102. (Copy in Div. 7.) 88–1 Refl. & Refr.

Dimmick, "A new Dichroic Reflector and its Application to Photocell Monitoring Systems," Journal of the Society of Motion Picture Engineers, No. XXXVIII, January 1942, pages 36–44. (Copy in Div. 7.) 88–1 Refl. & Refr.